(12) United States Patent
Vandracsek

(10) Patent No.: US 6,237,540 B1
(45) Date of Patent: May 29, 2001

(54) DEVICE FOR SECURING ANIMALS TO STATIONARY OBJECTS AND METHOD THEREFOR

(76) Inventor: Laszlo Z. Vandracsek, P. O. Box 31508, Phoenix, AZ (US) 85046

( * ) Notice: Subject to any disclaimer, the term of this patent is extended or adjusted under 35 U.S.C. 154(b) by 0 days.

(21) Appl. No.: 09/449,953

(22) Filed: Nov. 29, 1999

(51) Int. Cl.$^7$ ..................................................... A01K 27/00
(52) U.S. Cl. ......................... 119/795; 119/792; 119/791; 119/797
(58) Field of Search .................................... 119/795, 769, 119/786, 788, 791, 792, 797; 54/34

(56) References Cited

U.S. PATENT DOCUMENTS

| | | |
|---|---|---|
| 43,643 * | 7/1864 | Jerome . |
| 227,666 | 5/1880 | Witt . |
| 340,554 | 4/1886 | Cannon . |
| D. 353,477 * | 12/1994 | Terry .................................. D30/154 |
| D. 391,694 | 3/1998 | Eichhorn . |
| 3,648,664 * | 3/1972 | Nunley . |
| 4,182,272 * | 1/1980 | Taff . |
| 5,003,929 | 4/1991 | Dean . |
| 5,174,246 | 12/1992 | Driver . |
| 5,213,063 * | 5/1993 | Franck, III . |
| 5,950,570 * | 9/1999 | Dickerson ............................ 119/792 |

* cited by examiner

Primary Examiner—Charles T. Jordan
Assistant Examiner—Yvonne R. Abbott
(74) Attorney, Agent, or Firm—Jeffrey Weiss; Jeffrey D. Moy; Weiss & Moy, P.C.

(57) ABSTRACT

A horse securing device and method therefor, comprising a lanyard, an animal halter attachment member, a stationary object coupling member, a weight, and an adjustment member allowing the adjustment of the length of the lanyard. The horse is secured to the lanyard by the animal halter attachment member and the lanyard is secured to a stationary object by the stationary object coupling member to secure the horse to a stationary object to prevent the horse from leaving.

22 Claims, 1 Drawing Sheet

DEVICE FOR SECURING ANIMALS TO STATIONARY OBJECTS AND METHOD THEREFOR

FIELD OF THE INVENTION

This invention relates generally to horse securing devices and methods therefor and, more specifically, to a portable device and a method for securing horses to stationary objects.

BACKGROUND OF THE INVENTION

Horses generally need to be secured in a stable or tied up in some appropriate manner when not being ridden or personally attended. This is necessary to protect the horse from injury or mischief, and to prevent the horse from running away.

The problem of how to readily secure a horse is most easily solved in a ranch environment, where stables, fences, and hitching posts are readily available. However, in the field, away from a ranch setting, no such facilities are likely to be available. Some other way must be found, therefore, to secure horses in a non-ranch environment, using a portable securing device.

The prior art discloses several horse securing devices. For example, U.S. Pat. No. 227,666 issued to Witt and U.S. Pat. No. 340,554 issued to Cannon show a horse securing tether connected to a fixed rope which is held in position by a plurality of posts planted into the ground. However, these designs are relatively complicated and non-portable. U.S. Design Pat. No. D391,694 issued to Eichhorn appears to show a more portable tethering system, however it too appears to require the coupling of the system to a rope—like the Witt and Cannon designs—through its use of a "snap hook."

There are additional problems with the devices of the prior art. A proper, portable horse tethering system needs to secure a horse to an appropriate stationary object such as a tree trunk or branch, in an orientation in which on the one hand the horse cannot readily move around and, on the other, in which the horse's head and neck are not being subjected to a constant downward pull. Thus, Cannon illustrates a system in which the weight is sufficiently light that it may be readily lifted by the horse, allowing the horse to wander relatively far from the point at which it was tethered and potentially to encounter trouble or injury. Moreover, none of the prior art systems disclose an adjustable length device, in which the length of the device between the halter attachment and the weight is adjustable—to accommodate different sized horses, as well as the securing of the system to either low-lying or relatively high stationary objects—so as to maintain the desired secure retention of the horse without downward pull on the head and neck.

SUMMARY OF THE INVENTION

An object of the present invention is to provide an improved, portable horse securing device.

It is a further object of the present invention to provide a horse securing device that is adjustable in length.

It is a still further object of the present invention to provide a horse securing device that is readily attachable to a variety of stationary objects, including tree trunks.

BRIEF DESCRIPTION OF THE PREFERRED EMBODIMENTS

In accordance with one embodiment of the present invention, a horse securing device is disclosed, comprising, in combination, a lanyard having a first end and a second end; means, connected proximate the first end of the lanyard, for attaching the lanyard to an animal halter; means, slidably coupled to the lanyard at a point between the attachment means and the second end of the lanyard for coupling the lanyard to a stationary object; a weight coupled to the lanyard at a point between the coupling means and the second end of the lanyard; and means, located on the lanyard, for adjusting the distance between the attachment means and the weight.

In accordance with another embodiment of the present invention, a method for securing an animal to a stationary object is disclosed, comprising, in combination, the steps of providing a lanyard having a first end and a second end; providing means connected proximate the first end of the lanyard for attaching the lanyard to an animal halter; providing means slidably coupled to the lanyard at a point between the attachment means and the second end of the lanyard for coupling the lanyard to a stationary object; providing a weight coupled to the lanyard at a point between the coupling means and the second end of the lanyard; providing means, located on the lanyard, for adjusting the distance between the attachment means and the weight; attaching the lanyard to the animal halter; and coupling the lanyard to said stationary object.

The foregoing and other objects, features, and advantages of the invention will be apparent from the following, more particular description of the preferred embodiments of the invention, as illustrated in the accompanying drawings.

DETAILED DESCRIPTION OF THE PREFERRED EMBODIMENTS

Figure 1:
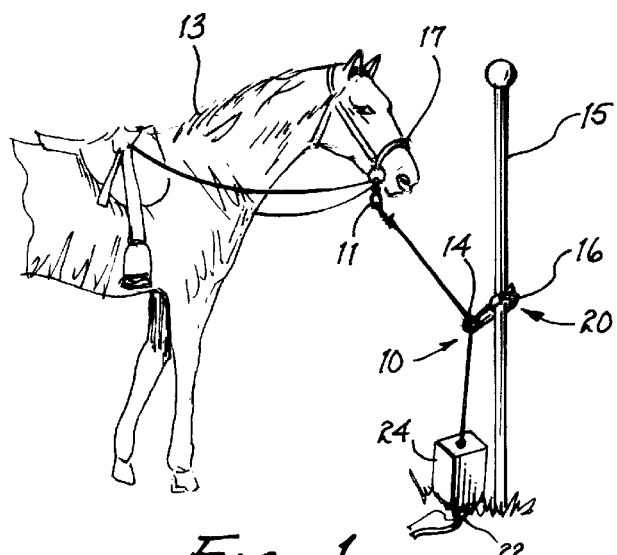
FIG. 1 is a perspective view of the preferred embodiment of the horse securing device of the present invention in use, wherein the coupling means comprises a belt attached to a post.
Figure 2:
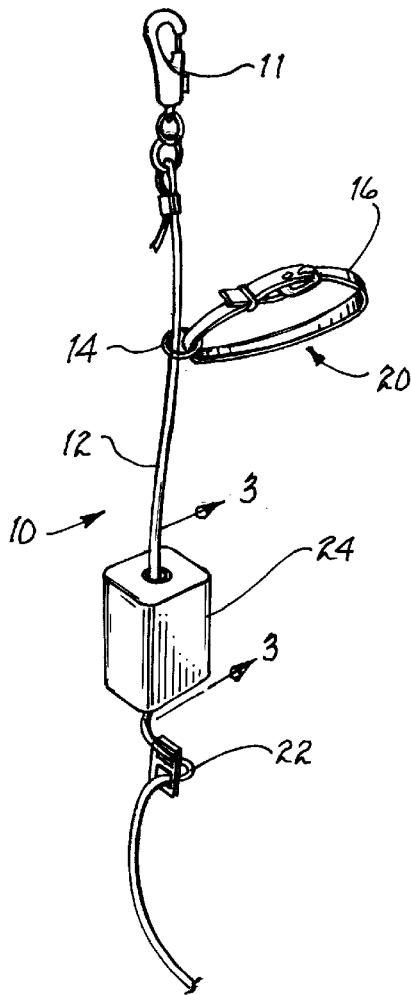
FIG. 2 is a side view of the horse securing device of FIG. 1.

Referring to FIGS. 1–2, reference number 10 refers generally to the horse securing device, hereinafter horse securing device 10, of the present invention. The horse securing device 10 generally comprises a lanyard 12, having at a first end thereof a shackle 11 (or other suitable device) dimensioned to be coupled with an animal halter 17 (shown in FIG. 1 only) of a horse 13 (shown in FIG. 1 only).

Figure 4:
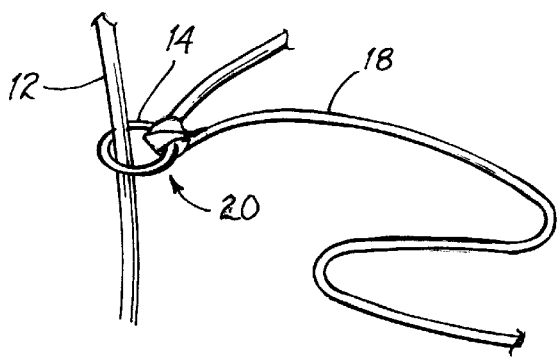
FIG. 4 is a side view of another embodiment of the horse securing device of the present invention, wherein the coupling means comprises a rope.

Still referring to FIGS. 1–2, a coupling apparatus 20 of the present invention is shown and described. The coupling apparatus 20 is preferably slidably coupled to the lanyard 12 by a ring 14. In one embodiment (shown in FIGS. 1–2), the coupling apparatus 20 includes an adjustable-length belt 16 suitable for coupling the lanyard 12 to a stationary object, such as a post 15 (shown in FIG. 1 only) or a tree branch or trunk (not shown). In another embodiment (shown in FIG. 4), the coupling apparatus 20 is a rope 18. Of course, the coupling apparatus 20 could be of any structure that performs the function of securably coupling the lanyard 12 to a stationary object.

Figure 5:
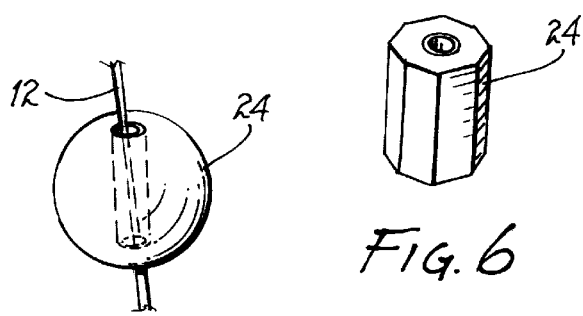
FIG. 5 is a side view of another embodiment of the weight for the horse securing device of the present invention wherein the weight is spherical.
Figure 6:
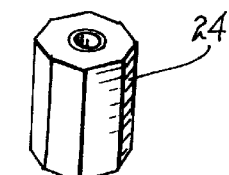
FIG. 6 is a side view of another embodiment of the weight for the horse securing device of the present invention wherein the weight is hexagonal.
Figure 3:
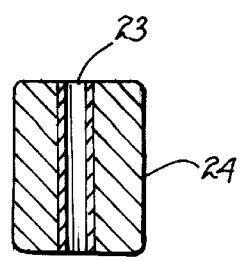
FIG. 3 is a cross-sectional view of the rectangular weight of the horse securing device of FIG. 2, taken along line 3—3.

Still referring to FIGS. 1–2, a weight 24 is coupled to the lanyard 12 at a point between the coupling apparatus 20 and the second end of the lanyard 12. In the preferred embodiment, the weight 24 is slidably coupled to the lanyard 12 about a vertical bore 23 therethrough (shown in FIG. 3). While in this embodiment the weight 24 is slidably coupled to the lanyard 12, the weight 24 may be fixably connected to the lanyard 12 at a point between the coupling apparatus 20 and the second end of the lanyard 12, or even at the second end, as long as an adjustment member 22 is located along the lanyard 12 at a point that is between the weight 24 and the shackle 11. In the embodiment of the present invention shown in FIGS. 1–2, the weight 24 is substantially rectangular. In an alternative embodiment (shown in FIG. 5), the weight 24 is substantially spherical. In yet another alternative embodiment (shown in FIG. 6), the weight 24 is substantially hexagonal. Additionally, the weight 24 may be formed in other desired shapes having sufficient weight and portability. The weight 24 may be formed from any desired material, including rubber, plastic, wood, metal, or perhaps some combination thereof (e.g., metal coated with a rubber-type material).

In sizing the weight 24, the two critical factors are portability and securability. Thus, the weight 24 must be light enough to be portable, while heavy enough to make it difficult for a tethered horse, in normal circumstances, to move the weight 24. The desired weight of the weight 24 will depend on the size and type of horse, with the a larger, stronger horse requiring a heavier weight 24 than a smaller, weaker horse. Preferably, to achieve this balance, the weight 24 should weigh between approximately 20 ounces and approximately 50 ounces, with a weight of approximately 32 ounces being considered optimal for a full grown sport horse.

Referring now to FIGS. 1–2, in the preferred embodiment, the adjustment member 22 is a buckle located between the weight 24 and the second end of the lanyard 12, wherein the buckle 22 is adapted to frictionally receive therethrough the lanyard 12 to adjust the length of the lanyard 12. While, in this embodiment, the adjustment member 22 is a buckle, any structure allowing the ready adjustment of the length of the lanyard 12, including for example a knot in the lanyard, will be within the spirit and scope of the invention.

While the invention has been particularly shown and described with reference to preferred embodiments thereof, it will be understood by those skilled in the art that the foregoing and other changes in form and details may be made therein without departing from the spirit and scope of the invention.

I claim:

1. A device for securing an animal to a stationary object comprising, in combination:

a lanyard having a first end and a second end;
   means connected proximate said first end of said lanyard, for attaching said lanyard to an animal halter;
   means slidably coupled to said lanyard at a point between said attachment means and said second end of said lanyard for coupling said lanyard to a stationary object;
   a weight coupled to said lanyard at a point between said coupling means and said second end of said lanyard; and
   means located on said lanyard for adjusting the distance between said attachment means and said weight.

2. The device of claim 1, wherein said attachment means comprises a shackle.

3. The device of claim 1, wherein said weight is slidably coupled to said lanyard about a vertical bore therethrough.

4. The device of claim 3, wherein said weight is substantially spherical.

5. The device of claim 3, wherein said weight is substantially rectangular.

6. The device of claim 3, wherein said weight is substantially hexagonal.

7. The device of claim 3, wherein said weight weighs at least approximately 20 ounces.

8. The device of claim 3, wherein said weight weighs between approximately 20 ounces and approximately 50 ounces.

9. The device of claim 1, wherein said adjustment means comprises a buckle located between said weight and said second end of said lanyard, wherein said buckle is adapted to frictionally receive therethrough said lanyard.

10. The device of claim 1, wherein said coupling means comprises a rope.

11. The device of claim 1, wherein said coupling means comprises an adjustable-length belt.

12. A method for securing an animal to a stationary object comprising, in combination, the steps of:

providing a lanyard having a first end and a second end;
   providing means connected proximate said first end of said lanyard for attaching said lanyard to an animal halter;
   providing means slidably coupled to said lanyard at a point between said attachment means and said second end of said lanyard for coupling said lanyard to a stationary object;
   providing a weight coupled to said lanyard at a point between said coupling means and said second end of said lanyard;
   providing means located on said lanyard for adjusting the distance between said attachment means and said weight;
   attaching said lanyard to said animal halter; and
   coupling said lanyard to said stationary object.

13. The method of claim 12, wherein said attachment means comprises a shackle.

14. The method of claim 13, wherein said weight is substantially spherical.

15. The method of claim 13, wherein said weight is substantially rectangular.

16. The method of claim 13, wherein said weight is substantially hexagonal.

17. The method of claim 13, wherein said weight weighs at least approximately 20 ounces.

18. The method of claim 13, wherein said weight weighs between approximately 20 ounces and approximately 50 ounces.

19. The method of claim 12, wherein said weight is slidably coupled to said lanyard about a vertical bore therethrough.

20. The method of claim 12, wherein said adjustment means comprises a buckle located between said weight and said second end of said lanyard, wherein said buckle is adapted to frictionally receive therethrough said lanyard.

21. The method of claim 12, wherein said coupling means comprises a rope.

22. The method of claim 12, wherein said coupling means comprises an adjustable-length belt.

* * * * *